United States Patent
Beier et al.

(10) Patent No.: US 7,208,432 B1
(45) Date of Patent: Apr. 24, 2007

(54) FRICTION LINING FOR BRAKING SYSTEM COMPONENTS

(75) Inventors: Wolfram Beier, Essenheim (DE); Rainer Liebald, Nauheim (DE); Jochen Heinz, Neumuenster (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 10/110,996

(22) PCT Filed: Oct. 13, 2000

(86) PCT No.: PCT/EP00/10096

§ 371 (c)(1), (2), (4) Date: Nov. 12, 2002

(87) PCT Pub. No.: WO01/28947

PCT Pub. Date: Apr. 26, 2001

(30) Foreign Application Priority Data

Oct. 20, 1999 (DE) .............................. 199 50 622

(51) Int. Cl.
  *F16D 69/02* (2006.01)
  *C03C 14/00* (2006.01)
  *C04B 35/80* (2006.01)

(52) U.S. Cl. .................. 501/95.2; 501/32; 106/36; 188/218 XL; 188/251 A

(58) Field of Classification Search .............. 501/32, 501/95.2; 188/251 A, 218 XL; 106/36; 977/DIG. 1
See application file for complete search history.

(56) References Cited

U.S. PATENT DOCUMENTS

| | | | |
|---|---|---|---|
| 3,907,586 A | * | 9/1975 | Kiefer ..................... 501/66 |
| 4,217,255 A | | 8/1980 | Griffith |
| 5,132,256 A | | 7/1992 | Gadkaree et al. .......... 501/95.2 |
| 5,571,756 A | | 11/1996 | Haselkorn et al. .......... 501/32 |
| 5,585,166 A | * | 12/1996 | Kearsey ..................... 428/212 |
| 5,817,411 A | * | 10/1998 | Nakajima ................... 428/334 |
| 6,110,268 A | | 8/2000 | Gross et al. ................ 106/36 |
| 6,316,086 B1 | | 11/2001 | Beier et al. ............. 428/293.4 |

FOREIGN PATENT DOCUMENTS

| | | | |
|---|---|---|---|
| DE | 29804229 | | 5/1998 |
| DE | 19817611 | | 10/1999 |
| GB | 2 336 595 A | | 10/1999 |
| KR | 1998-701937 | | 5/1998 |
| WO | 89/08685 | * | 9/1989 |
| WO | WO 96/23952 | | 8/1996 |

OTHER PUBLICATIONS

Reinicke R et al. "Tribological properties of SiC and C-fiber reinforced glass matrix composites," 12th International Conference on Wear of Materials, Apr. 25-29, 1999, pp. 1315-1321, Elsevier, Switzerland.

Bergmann et al., "Mo Molybdenum," *Gmelin Handbook of Inorganic and Organometallic Chemistry*, Suppl. vol. B7, pp. 69-71.

Korean Secondary Official Action for Application No. 10-2002-7004533, Jan. 6, 2005.

Translation of Korean Application No. 10-2002-7004533, Jan. 6, 2005.

* cited by examiner

*Primary Examiner*—Karl Group
(74) *Attorney, Agent, or Firm*—Millen, White, Zelano & Branigan PC

(57) ABSTRACT

The invention relates to friction linings for structural and functional elements used in braking systems, especially in systems for motor vehicles. Said friction linings consist of an inorganic composite material which in turn consists of a glass or glass ceramics matrix, inorganic reinforcing fibers and one or more fillers, including one or more anti-friction substances with planar hexagonal structural elements.

4 Claims, No Drawings

FRICTION LINING FOR BRAKING SYSTEM COMPONENTS

The invention relates to friction linings for components and functional elements in brake systems, in particular in systems for motor vehicles, comprising an inorganic composite material which comprises a glass or glass ceramic matrix, inorganic reinforcing fibers and one or more fillers.

Components or functional elements in brake systems, for example for land vehicles (passenger cars, utility vehicles, rail vehicles, etc.) or aircraft should allow the highest possible deceleration to be achieved.

Important technical criteria for assessing friction linings for brakes, in particular for motor vehicle brakes, are the coefficient of friction $\mu$, the wear, the mechanical strength and fracture toughness, the rotational speed at which rupture occurs, the tendency toward self-induced frictional vibrations ("bucking" or "jerking") and frictional noise, the ability to withstand thermal loads.

In detail, this means:

The coefficient of friction $\mu$ should be as high as possible and be as independent as possible of the operating and ambient conditions. Since the forces which can be transmitted are proportional to the product of the coefficient of friction and the contact pressure ($\mu \times F_A$), the size of the brake can be decreased, while maintaining the contact force, as the coefficient of friction $\mu$ rises. The coefficient of friction of the friction lining is dependent on the partner material. Standard partner materials in motor vehicle brakes are gray cast iron or steel. The friction linings which are currently in use for passenger car brakes, in practical operation, against gray cast iron have $\mu$ values of approx. 0.2–0.5. When designing the brakes, the starting point used is a design value of 0.25, which already incorporates a safety factor. The coefficient of friction should be as constant as possible with regard to changes in temperature, humidity, contact pressure and angular velocity.

The wear to the friction linings should be low. The ideal service life of the linings when the brake is operated correctly would be the driving life of the vehicle, but it is customary for brake linings to be replaced over the course of the life of the vehicle. Naturally, the partner material for the friction lining should also not be worn excessively by the lining. A measure of the wear is the wear rate.

A high mechanical strength and fracture toughness are required in particular when the linings are fitted by riveting, clamping or adhesive bonding.

The rotational speed at which rupture occurs should be 1.7–2 times the maximum wheel speed, i.e. usually around 5000/min, since such high rotational speeds of the brake disk can occur at high driving speeds of a passenger car.

Jerking or noise are among the most serious quality problems in connection with braking. Jerking is said to occur when a resonant frequency of the "braking installation" system, if appropriate together with the suspension, is excited so greatly that vibrations of the vehicle become noticeable. Jerking cannot readily be quantified, but is of great importance to the subjective impression gained by the driver. The intensity of jerking when it occurs is dependent not only on the lining but also on the design of the overall "brake" system and its spring elements, although lining-related jerking does make up a significant proportion. Brakes which have little or no inclination to jerk, i.e. which have good levels of comfort performance, are required.

In practice, friction linings for brakes have to withstand considerable thermal loads without being damaged, i.e. also without being distorted. Therefore, one development aim is to shift the temperature limit at which fading occurs further upward. Compared to clutch friction linings, the duration of load and also the pressure which acts on the lining during the load is higher in friction linings for brakes, and consequently demands imposed on the ability to withstand thermal loads are particularly high.

A further aspect, the environmental friendliness of the materials used, can be considered to have been solved at least to the extent that it is no longer necessary to use asbestos, as was once customary for brake linings.

The friction linings which are currently commercially available for motor vehicle brakes are composite materials with an organic (polymer) matrix. They comprise yarns which are embedded in a frictional cement comprising resins, rubbers and fillers, such as carbon black, graphite and kaolin. The yarns preferably consist of polyacrylonitrile, aramid, cellulose, glass and other fibers and brass or copper wire. Friction linings of this type provide very good comfort but, on account of their organic constituents, in particular the organic matrix, have an unsatisfactory ability to withstand thermal loads, so that in the event of certain temperature limits being exceeded during braking, the coefficient of friction falls, resulting in a considerable reduction in comfort due to "lining jerking" and ultimately to fading (slipping of the brake). In the event of further loads, the friction lining will actually be destroyed and the braking function will fail altogether.

EP 0 469 464 B1 has disclosed a composite material for friction linings in which the binder matrix is produced from a mixture of $SiO_2$ and at least partially water-soluble silicates, e.g. alkali metal silicates (water glass) which is set in the presence of water. A material of this type will have unsatisfactory hydrolytic stability, which is disadvantageous for example in the event of condensation being formed when the temperature falls below the dew point.

U.S. Pat. No. 4,341,840 has disclosed glasses which are reinforced by graphite fibers for bearings, seals and brakes. These composite materials will not have sufficient ability to withstand thermal loads and will provide unsatisfactory comfort.

It is an object of the invention to find a friction lining for brake systems, in particular motor vehicle brakes, which has an improved profile of properties, in particular an increased ability to withstand thermal loads and, in combination with this, the ability to transmit a higher braking moment for a predetermined friction lining area.

This object is achieved by the inorganic composite material described in claim 1.

Surprisingly, it has been found that a purely inorganic composite material comprising a glass or glass ceramic matrix, inorganic reinforcing fibers and one or more fillers, on account of its particular properties, is particularly suitable for use as a friction lining for brake systems if one or more slip agents which have planar hexagonal structural elements are included as filler.

The production of fiber-reinforced glass or fiber-reinforced glass ceramic is well known and described in numerous publications, including, purely by way of example, U.S. Pat. No. 4,610,917, U.S. Pat. No. 4,626,515 and U.S. Pat. No. 5,079,196.

The addition of fillers and functional substances, referred to below simply as fillers, as additives to a binder matrix is also known, for example from EP 0 469 464 B1. The fillers are incorporated during the production process, for example are added to the slurry.

In principle, any glass can be reinforced with ceramic fibers. To avoid or reduce internal stresses, it is appropriate to aim to match the coefficients of thermal expansion to some extent. Since silicon carbide fibers and carbon fibers, which are frequently used as reinforcing fibers, have low thermal expansions, glasses which have a coefficient of thermal expansion $\alpha_{20/300}$ of less than $10 \times 10^{-6}$/K are preferred as the matrix.

The maximum permissible temperature for a reinforced composite material of this type is dependent on its specific constituents and on its microstructure. The glass transition temperature $T_g$ of the glass used as matrix represents a guideline for the maximum long-term use temperature. However, the fiber reinforcement can increase the ability to withstand thermal loads, so that fiber-reinforced glasses can even successfully withstand temperatures which are higher than the $T_g$ of the glass matrix.

Glasses which contain boron trioxide have proven to be particularly suitable matrix glasses. Borosilicate glasses, the most well-known representatives of which on the commercial market are known under the names Duran® and Pyrex®, have a low coefficient of thermal expansion $\alpha_{20/300}$, specifically in the range from approx. 3 to $5 \times 10^{-6}$/K, and a $T_g$ in the range from approx. 500° C. to 600° C.

These glasses generally have an approximate composition (in % by weight based on oxide) of 70–80 $SiO_2$, 7–14 $B_2O_3$, 4–8 alkali metal oxide and 2–8 $Al_2O_3$.

Aluminosilicate glasses, in particular glasses having an approximate composition (in % by weight based on oxide) of 50–55 $SiO_2$, 8–12 $B_2O_3$, 10–20 alkaline earth metal oxide and 20–25 $Al_2O_3$, are also eminently suitable matrix glasses, since they have a high ability to withstand thermal loads. They have a $T_g$ in the range from approximately 650° C. to 750° C.

However, alkali metal-alkaline earth metal silicate glasses (e.g. approximate composition in % by weight 74 $SiO_2$, 16 $Na_2O$, 10 CaO) with a $T_g$ of approx. 540° C. and an $\alpha_{20/3000}$ of approx. $9 \times 10^{-6}$/K can also successfully be used as glass matrix for the composite material according to the invention.

Basalt glass and starting glasses for rock wool are also suitable as the glass matrix.

Furthermore, glasses such as those which are used for television tubes, specifically for the funnel and screen tube parts, are also suitable as the glass matrix. Screen glasses are generally alkali metal-alkaline earth metal silicate glasses having high levels of SrO and/or BaO. Funnel glasses are generally glasses of the same type which additionally contain small amounts of PbO. By contrast, glasses used for the neck of television tubes, known as neck glasses, have high PbO contents and are therefore less suitable in the present context, on account of the requirement for the materials to be environmentally friendly. Glass ceramics as the matrix have an even higher ability to withstand thermal loads. Glass ceramic and the production thereof by controlled crystallization have been known for decades.

Materials systems which are suitable for the glass ceramic matrix are, for example, $Li_2O$—$Al_2O_3$—$SiO_2$, MgO—$Al_2O_3$—$SiO_2$, CaO—$Al_2O_3$—$SiO_2$ or MgO—CaO—BaO—$Al_2O_3$—$SiO_2$, which can be modified by means of additives in various known ways.

The glass ceramic matrix may also comprise an $Li_2O$—$Al_2O_3$—$SiO_2$-crystal-containing borate glass or other crystallizing soldering glasses. Composites of this type have the advantage that they can be processed at relatively low temperatures but are able to withstand relatively high temperatures after crystallization.

The proportion of the composite material which is made up of the glass or glass ceramic matrix results as the remainder from the proportions of reinforcing fibers and fillers which are listed below. However, it should amount to not less than 5% by weight and not more than 60% by weight. A proportion of between 20 and 55% by weight is preferred, and a proportion of between 25 and 50% by weight is particularly preferred.

Reinforcing fibers for glass and glass ceramic are likewise well known, and numerous inorganic reinforcing fibers are suitable for the present purpose. Use is made primarily of fibers of carbon, SiC, BN, $Si_3N_4$, $Al_2O_3$, $ZrO_2$, mullite, in this case in particular of 3 $Al_2O_3 \times 2$ $SiO_2$, calcium silicates (xCaO.y $SiO_2$), fused silica, glasses which have a high $SiO_2$ content, i.e. glasses which have a $SiO_2$ content of more than 80% by weight, A-, C-, S- or E-glass and/or rock wools, for example basalt wool, as main components, with or without additions of Si, Ti, Zr, Al, O, C, N, e.g. fibers of the sialon type (Si, Al, O, N), or their oxides and/or carbides.

E-glass is a calcium aluminoborosilicate glass which is substantially free of alkali metals. S-glass is a magnesium aluminosilicate glass, C-glass is a sodium calcium borosilicate glass and A-glass is a sodium calcium silicate glass.

Carbon fibers and silicon carbide fibers are particularly suitable. A high proportion of SiC fibers reduces wear. A high proportion of C fibers, replacing the SiC fibers, makes the composite material less expensive.

Composite materials which contain both SiC fibers and C fibers are particularly advantageous, since the wear can be reduced and the frictional behavior can be adapted using the inexpensive C fibers.

A SiC/C ratio of approximately 1:4 is particularly preferred. Reducing the proportion of SiC to 1/5 allows production costs for the composite material to be reduced hugely without it being necessary to accept a deterioration in the properties.

To improve the frictional and comfort properties, the reinforcing fibers may also be provided with a coating, generally a thin coating, for example comprising carbon, carbides, $SiO_2$, $Al_2O_3$ or other oxides.

The fiber content of the composite material is between approximately 5 and 55% by weight. A higher filling level is achieved only at considerable cost, while if there is less than 5% by weight of fibers the property changes produced by the fiber reinforcement, in particular the increase in strength, are very minor and uniform distribution of the fibers in the matrix becomes more difficult.

A fiber content of approximately 25 to 45% by weight is preferred for economical and technical reasons.

If a plurality of different types of fiber are used, hybrid composites are obtained.

In addition to the glass/glass ceramic matrix and the inorganic reinforcing fibers, the friction lining according to the invention also contains one or more inorganic fillers, which are used in powder form. According to the invention, at least a proportion of the filler content used is a slip agent which contains planar hexagonal structural elements. Preferred slip agents are: sheet silicates, carbon black, graphite, mica, $MoS_2$. Particularly preferred slip agents are: carbon black, graphite.

The most important fillers are listed by way of example below.

In addition to the abovementioned slip agents, these fillers are $SiO_2$, used as crystalline quartz, diatomaceous earth, quartz glass or vitreous fused silica, $Al_2O_3$, $ZrO_2$ or similar oxides, also $Fe_2O_3$ and $Cr_2O_3$, calcium silicates, such as wollastonite ($CaO \times SiO_2$), $2 CaO \times SiO_2$, $3 CaO \times SiO_2$, magnesium silicates and their hydrates, e.g. talc ($3 MgO \times 4 Si_2 \times H_2O$), zirconium silicate, dolomite, aluminosilicates, such as mullite, sillimanite, kaolin or clay, further calcium aluminosilicates, potassium aluminosilicates and magnesium aluminosilicates, e.g. cordierite, also cement, magnesium oxide, magnesium carbonate and its hydrates, magnesium aluminate, chromite, titanium oxide, e.g. rutile, titanium boride, aluminum titanate, further carbonates, e.g. lime, also quicklime (CaO), sulfates, e.g. $BaSO_4$, gypsum, especially as hemihydrate or anhydrite, sulfides such as $MOS_2$ or CuS, nitrides, e.g. BN, carbides, e.g. SiC, $B_4C$, TiC, powdered coke, glass ceramic, for example from the materials systems listed for the glass ceramic, and metals, e.g. copper, aluminum, magnesium, iron or steel, or semimetals, such as silicon and/or their alloys.

The fillers may, for example, be vitreous, ceramic or metallic. A vitreous filler or a filler comprising glass ceramic can be differentiated from the glass or glass ceramic matrix given different compositions, for example by means of electron beam microsensor. If the same glass or the same glass ceramic is used as matrix and as filler, this analysis method is not suitable. However, it is possible to differentiate the matrix from the filler by means of optical methods, since the matrix has been completely melted, unlike the filler.

It is preferable for the fillers used to be $SiO_2$, $Al_2O_3$, $ZrO_2$, magnesium silicates and their hydrates, calcium silicates, mullite, kaolin, SiC, TiC, TiB, $BaSO_4$, BN, glass ceramic, carbon, carbon black or powdered coke. The hard materials are distinguished by the fact that they increase the resistance to wear, while the components with a lower hardness improve the comfort behavior.

It is particularly advantageous for one or more fillers selected from the group consisting of SiC, $ZrO_2$, $Al_2O_3$, glass ceramic and $TiB_2$ to be used in addition to the slip agent(s).

In a very particularly advantageous embodiment, the slip agent(s), in particular carbon black, graphite and/or mica, is used together with a component selected from the group consisting of $ZrO_2$, $TiB_2$ and glass ceramic.

The content of slip agent, in particular the content of carbon black, is preferably more than 15%, in particular more than 50%, based on the filler content, although it is preferable for at least one further filler to be present as well as the slip agent.

The carbon black which is used as slip agent is present in the form of primary particles and of agglomerates of these primary particles, preferably in the form of agglomerates (flakes of carbon black) of particles (primary particles) which have a mean diameter of between 1 nm and 10 nm. It is preferable for the carbon black to be in the form of primary-particle agglomerates with a mean diameter of between 10 nm and 50 nm, preferably between 10 nm and 500 nm. Carbon black with agglomerates with a mean diameter of between 10 nm and 150 nm is particularly preferred. Therefore, carbon black with a mean particle size (primary particles or primary-particle agglomerates) of between 1 nm and 50 μm is preferred, between 1 nm and 500 nm is particularly preferred, and between 1 nm and 150 nm is very particularly preferred.

The amount of fillers in the composite material is at least approximately 5% by weight and at most 50% by weight. If the levels are lower, their effect is insufficient, while if the levels are higher, processing difficulties occur.

A filler content of 25 to 40% by weight is particularly preferred.

In general, the composite materials can be adapted to their particular application by suitable selection of matrix, fibers and fillers. Many physical properties, such as thermal expansion, thermal conductivity, creep under thermal load, tribological behavior, etc. can be varied and set within certain limits.

The fibers which are incorporated in the composite material can be varied in numerous ways, specifically not only in terms of the chemical composition but also in terms of the microstructure and the external geometry.

The microstructure of the fibers (given the same chemical composition) determines the physical properties. For example, in the case of C fibers there are special high-modulus and high-strength fibers, the different degree of graphitization of which influences the tribological and thermal behavior. Therefore, when the same reinforcing fibers are used, variations are possible to a limited extent, on the basis of which variations the composite material can be optimized toward the desired properties.

The geometry (shape and dimensions) of the reinforcing fibers and the arrangement of the fibers in the composite offer particularly widespread possibilities of variation.

For example, the glasses and glass ceramics can be reinforced with whiskers, short fibers, long fibers or continuous fibers, and there are further possibilities when using fiber mats, woven fiber fabrics and fiber felt. Furthermore, the orientation of the fibers in the material can be matched to the geometry of the component which is produced from the material, for example by producing circular ring structures or ring structures of some other shape or annular components by winding.

Whiskers and short fibers (fiber length up to approx. 5 mm) are generally distributed isotropically in the composite, which leads to isotropic properties, but may also be partially oriented, for example by extrusion at elevated temperature. Very high fracture toughnesses cannot be achieved with whiskers or short fibers. By contrast, long and continuous fibers are arranged in parallel, at least in relatively large parts of the composite, which leads to a considerable improvement in the mechanical properties of the composite in this direction but produces scarcely any improvement perpendicular thereto. However, a substantial degree of isotropy, at least with regard to one plane, can also be achieved when using long and continuous fibers by means of a laminate structure in which the fibers are arranged at angles to one another.

In general, the production and shaping of composites with long or continuous fibers is more difficult than with whiskers and short fibers but, on the other hand, does allow particularly good mechanical values to be achieved in preferred directions. Suitable selection of the fiber architecture makes it possible to develop components which are matched to the expected loads. The way in which the fiber architecture is to be designed in fiber-reinforced components is known to the person skilled in the art, for example from fiber-reinforced plastic components.

The use of fiber felt and woven fiber fabrics results in composite materials which, although they have only moderate strength values compared to long-fiber or continuous-fiber composite materials, can be produced using low-cost techniques. For example, woven fabrics and felt can also be infiltrated with glass melts or with sol-gel solutions which can be converted into glass or glass ceramic by a subsequent heat treatment.

The way in which the material is produced, i.e. whether it is produced with whiskers, continuous fibers, long fibers, short fibers, woven fabrics, felt, etc. depends on the specific physical and technical requirements and, of course, on the production costs, which determine the price of the material and therefore its economic viability.

On account of the particular requirements with regard to technical specifications and economic production, it is preferable to use short fibers in a random orientation for the friction lining according to the invention, although good results can also be achieved with oriented fiber architectures.

The mechanical properties, such as the strength and modulus of elasticity of fiber-reinforced glasses or glass ceramics are substantially determined by the quantity and arrangement of the fibers introduced. The thermomechanical properties, i.e. the thermal expansion, and the thermal properties, e.g. the thermal conductivity, are, like the tribological properties, such as coefficients of friction and wear, influenced by the composition of the overall composite, i.e. by the proportions of individual components and by their properties.

For example, with C or SiC fibers with a unidirectional fiber arrangement and a fiber content of approx. 40% by weight, tensile bending strengths of more than 1200 Mpa and moduli of elasticity of more than 130 Gpa are achieved, with a simultaneous increase in the fracture work compared to pure glasses or glass ceramics. With a multidirectionally oriented or random fiber arrangement and a changed fiber content, lower strengths and moduli of elasticity result, depending on the proportion of fibers present in the composite in the direction of load.

Purely SiC-fiber-reinforced glasses have a very low anisotropic thermal conductivity, amounting to approx. $1.5 \, W \times m^{-1} \times K^{-1}$, which can be adjusted by introducing additional components as a function of the proportion thereof. For example, the thermal conductivity and also the thermal expansion are increased by the addition of carbon fibers and/or carbon, metal and/or ceramic powder. The addition of components having a low thermal conductivity and a low thermal expansion, e.g. fused silica, allows these properties to be reduced accordingly.

The composite materials can be mechanically processed with success, so that they can readily be integrated on/in the brake installation as linings, generally by riveting, screw connection, clamping or adhesive bonding.

The purely inorganic slip-agent-containing composite materials described having a water-insoluble matrix withstand the specific combination of thermal and tribo-mechanical loads to which friction linings for brakes are subjected excellently. Therefore, they also satisfy the requirements relating to the rotational speed at which rupture occurs.

They have a very good ability to withstand thermal loads and therefore satisfy the particularly high demands imposed on friction linings for brake systems. Furthermore, in addition to the required strength, they also have a constantly high coefficient of friction and a relatively low level of wear and provide good comfort.

Specifically, these composite materials have a substantially higher ability to withstand long-term thermal loads than conventional organic brake linings, a wear rate against gray cast iron of less than $1 \times 10^{-4}$ mm$^3$/Nm, a coefficient of friction μ against gray cast iron of between 0.3 and 0.8, and a high constancy of the coefficient of friction and sliding velocities from 4–40 m/s. In this case, the coefficient of friction and wear rate were determined in a block-ring arrangement, with the ring as metallic partner material, at pressures of up to 5 MPa and relative velocities of up to 5 m/s. The measurement in a pin-disk arrangement with the disk as metallic partner material gives the same values.

The composite materials are therefore eminently suitable for use as friction linings for brake systems. They are superior to the materials which have previously been used for this application. Their high ability to withstand long-term thermal loads distinguishes them from the organic linings which are customarily used. Compared to sintered metallic linings, they are distinguished in particular by a high level of comfort and by low wear to the partner material.

The purely inorganic composite materials which have been described therefore combine the required properties, which have hitherto in each case only partially been achieved, and are therefore eminently suitable for a very wide range of brake systems.

The standard motor vehicle brake is the hydraulically actuated disk or drum brake for decelerating these vehicles. Particularly in passenger cars and utility vehicles, but also rail-borne vehicles and aircrafts, the provision only of disk brakes is becoming increasingly widespread. The friction linings according to the invention are eminently suitable for these brake systems.

The composite materials described are equally suitable as friction linings for these standard brake systems as for further developments, such as for example brake systems which are actuated by electric motor means.

The composite materials described are also eminently suitable as friction linings for brake systems used in a very wide range of special vehicles, for example vehicles used in open-cast and underground mining and in military technology, e.g. self-propelled mountings, and of agricultural vehicles.

The composite materials are suitable not only as a friction lining for vehicles of the types described, but also as a friction lining for other brake systems, for example for flow machines and production machines, e.g. printing and textile machines, and for transport, conveying and lifting installations.

The invention is to be explained below with reference to exemplary embodiments.

Fiber-reinforced composite materials with fibers in a random arrangement were produced from various combinations of materials in a customary way, specifically using the slurry-sol-gel process.

Various mechanical and tribological properties of these materials were determined in test bench and motor vehicle tests.

Strengths of between 100 and 250 MPa and moduli of elasticity of up to 100 GPa were determined, according to the particular compositions.

The following percentages for the compositions represent % by weight.

Firstly, filler-free composite materials comprising 50% of borosilicate glass matrix (Duran®) and 50% of SiC and/or C fibers, specifically short fibers with a length of 1 to 50 mm, in various proportions were produced: C1–C5. The respective fiber proportions and the measurement results (coefficient of friction and wear rate) are shown in Table 1.

Starting from C1 (only SiC fibers) with a coefficient of friction of 0.4, a wear rate of $2 \times 10^{-6}$ mm$^3$/Nm and an unsatisfactory comfort performance, although the coefficient of friction rises to up to 0.8 (C5, only C fibers) as the C fiber content increases, the wear rate also increases, to up to $3 \times 10^{-5}$ mm$^3$/Nm (C5). The comfort is only slightly improved.

TABLE 1

Coefficients of friction and wear rates of composite materials comprising 50% of borosilicate glass matrix and 50% of fibers.

|  | C1 | C2 | C3 | C4 | C5 |
|---|---|---|---|---|---|
| Fibers: | | | | | |
| SiC | 50% | 40% | 25% | 10% | — |
| C | — | 10% | 25% | 40% | 50% |
| Coefficient of friction μ | 0.40 | 0.45 | 0.58 | 0.65 | 0.80 |
| Wear rate [mm³/Nm] | $2 \cdot 10^{-6}$ | $4 \cdot 10^{-6}$ | $7 \cdot 10^{-6}$ | $10 \cdot 10^{-6}$ | $30 \cdot 10^{-6}$ |

Secondly, composite materials comprising 40% of borosilicate glass matrix (Duran®), 30% of SiC (6%) and C fibers (24%) and 30% of various fillers or filler mixtures, which were free of slip agent (C6–C8) and contained slip agents, in particular carbon black (E1–E5), were produced.

Compared with the filler-free comparative examples with good results with regard to coefficient of friction and wear rate but less good comfort, in the filler-containing examples the coefficient of friction remains high (approx. 0.4–0.6), and the wear is kept within acceptable limits or even reduced, while the comfort is improved.

If the filler content comprises mixtures with carbon black powders of various particle or agglomerate diameters (I=1–2 nm, II=10–15 nm, III=100–150 nm) or mixtures thereof or mixtures with other slip agents, the coefficient of friction is high (up to approx. 0.6), and the wear remains adequately low. Above all, the comfort is improved. For three examples with filler mixtures comprising carbon black of various grain sizes and $ZrO_2$ (E1, E2, E3), the specific data for the coefficient of friction and the wear rate are listed in Table 2. The coefficient of friction is also improved or remains high, while the wear rate remains low, when using carbon black with mica and/or $ZrO_2$ as the combination of fillers. The comfort is also improved. Example E4 in Table 2 provides evidence of this. Glass ceramic also belongs in this group of fillers and additionally has the effect of reducing wear. The replacement of glass ceramic by titanium boride in combination with carbon black further reduces the wear (E5).

The friction lining comprising matrix, fibers and slip-agent-containing fillers therefore, compared to the filler-free examples and also the filler-containing but slip-agent-free examples, has a good level of comfort and combines a good, i.e. high coefficient of friction with a good, i.e. low wear rate. In particular, the comfort is improved. It can be described by the following qualitative indications:

C1–C5 inadequate
C6–C8 adequate
E1–E5 good

TABLE 2

Coefficients of friction and wear rates of composite materials comprising 40% of borosilicate glass matrix, 30% of fibers (6% of SiC, 24% of C) and 30% of fillers:

|  |  | Filler | Coefficient of friction μ | Wear rate (mm³/Nm) |
|---|---|---|---|---|
| C6 | 30% | $Al_2O_3$ | 0.42 | $5 \times 10^{-6}$ |
| C7 | 30% | $ZrO_2$ | 0.43 | $1 \times 10^{-6}$ |
| C8 | 15% | $ZrO_2$ | 0.60 | $30 \times 10^{-6}$ |
|  | 15% | Kaolin | | |
| E1 | 12% | $ZrO_2$ | 0.45 | $7 \cdot 10^{-6}$ |
|  | 18% | carbon black 1 | | $7 \cdot 10^{-6}$ |
| E2 | 5% | $ZrO_2$ | 0.46 | $5 \cdot 10^{-5}$ |
|  | 25% | carbon black 1 | | $5 \cdot 10^{-5}$ |
| E3 | 8% | $ZrO_2$ | 0.52 | $9 \cdot 10^{-5}$ |
|  | 22% | carbon black II | | |
| E4 | 20% | carbon black 1 | 0.53 | $7 \cdot 10^{-5}$ |
|  | 5% | Mica | | |
|  | 5% | $ZrO_2$ | | |
|  | 8% | Titanium boride | 0.43 | $3 \cdot 10^{-6}$ |
|  | 22% | Carbon black | | |

The invention claimed is:

1. A motor vehicle brake system comprising brake components and functional elements for a motor vehicle brake system, and a friction lining on at least one of the components or functional elements, comprising an inorganic composite material, which comprises
    a glass or glass ceramic matrix,
    inorganic reinforcing fibers, and
    at least one filler which is a slip agent having a planar hexagonal structure comprising carbon black particles or agglomerates with a mean diameter of 1 nm–500 nm.

2. A friction lining for components and functional elements for a brake system, comprising an inorganic composite material, which comprises
    a glass or glass ceramic matrix,
    inorganic reinforcing fibers,
    one or more fillers, wherein at least one of the fillers is a slip agent of carbon black comprising particles or agglomerates with a mean diameter of 1 nm–500 nm.

3. A friction lining according to claim 2, wherein the particles or agglomerates have a mean diameter of 1 nm–150 nm.

4. A motor vehicle brake system according to claim 1 wherein said friction lining further comprises graphite, sheet silicate, mica or $MoS_2$.

* * * * *